Nov. 20, 1923.

W. D. HENRY

TOWING TONGUE

Filed Feb. 5, 1921

1,475,117

INVENTOR.

W. D. Henry

BY

Victor J. Evans.

ATTORNEY.

Patented Nov. 20, 1923.

1,475,117

UNITED STATES PATENT OFFICE.

WILLIAM D. HENRY, OF GREENVILLE, ILLINOIS.

TOWING TONGUE.

Application filed February 5, 1921. Serial No. 442,742.

*To all whom it may concern:*

Be it known that I, WILLIAM D. HENRY, a citizen of the United States, residing at Greenville, in the county of Bond and State of Illinois, have invented new and useful Improvements in Towing Tongues, of which the following is a specification.

This invention relates to towing tongues or couplings for motor vehicles and an object of the invention is to provide a device of this nature which may be used for towing disabled motor vehicles, trailers, or the like, and which may be quickly and easily attached to the front axle of the vehicle to be towed and one which, owing to its rigidity, will prevent the towed vehicle from running up on the towing vehicle when traveling down inclines or when the speed of the towing vehicle is slackened.

Another object of the invention is to provide a towing tongue as specified which embodies means for attachment to the steering mechanism of the towed vehicle to permit it to be steered in unison with the direction of travel of the towing vehicle and eliminate the requirement of an operator riding in the towed vehicle to properly steer same.

Another object of this invention is to provide a device as specified which may be attached to any type of vehicle without requiring alteration of the vehicle.

Other objects of the invention will appear in the following detailed description and in the accompanying drawing wherein.

Figure 1:
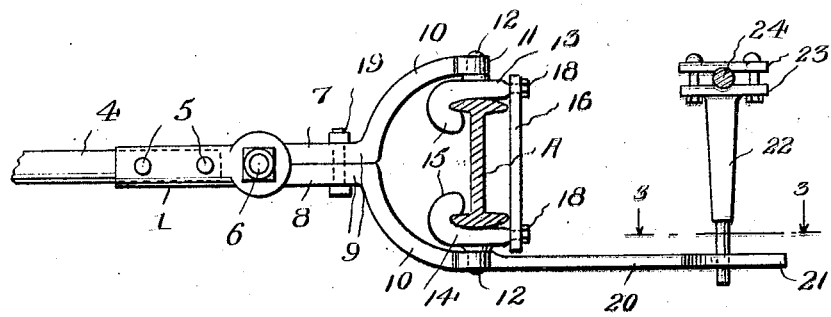
Fig. 1 is a side elevation of the improved towing tongue showing it applied to the front axle of a vehicle to be towed.
Figure 2:
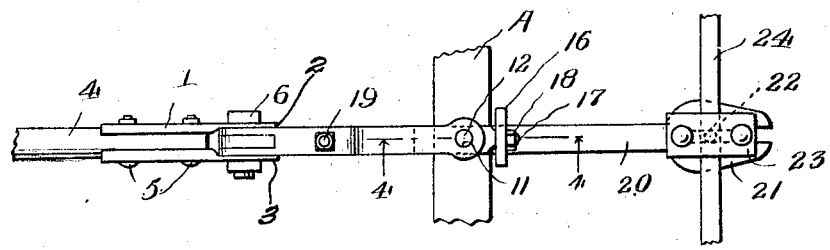
Fig. 2 is a top plan of the towing tongue.
Figure 3:
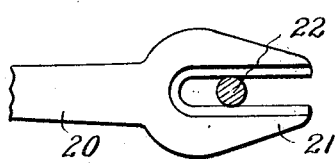
Fig. 3 is a detailed horizontal section on the line 3—3 of Fig. 1.
Figure 4:
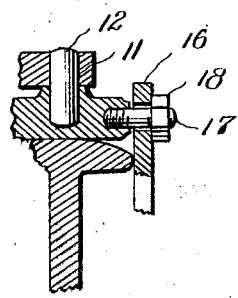
Fig. 4 is a detailed vertical section taken on the line 4—4 of Fig. 2.

Referring more particularly to the drawing the improved towing tongue comprises a socket 1 including sections 2 and 3 which are attached to the rigid pole 4. The pole 4 may be made of pipe, metal bar, or any suitable material and it is detachably connected to the socket 1 by transverse bolts 5. The sections 2 and 3 are pivotally connected by a bolt 6 to the hinged connecting ends of the arms 7 and 8. The arms 7 and 8 comprise parallel extending portions 9 and flared portions 10 forming a fork adapted for engagement above and below a front axle A of a motor vehicle. The portions 10 of the arms 7 and 8 are provided with openings 11 which receive therein pins 12 for connecting the arms to the axle clamps 13 and 14 respectively which are provided with axle engaging bills 15 and are clamped upon the axle A by a clamping plate 16 which engages the axle upon the side opposite that engaged by the bills 15 and which clamping plate receives therethrough the threaded studs 17 formed upon the clamps 13 and 14. Nuts 18 are mounted on the studs 17 and bear against the plate 16 for securely clamping the plate 16 and clamps 13 and 14 in engagement with axle A. The pivotal connection of the arms 7 and 8 permits separating of their perforated ends for connection with axles of various sizes and suitable means, such as a bolt 19, is provided for rigidly clamping them in place after they have been adjusted and connected to the axle A.

The arm 8 has an extension 20 formed thereupon which has an alligator jaw 21 upon its free end. The alligator jaw 21 grips a shift pin 22 which is in turn connected by a clamp structure 23 to a cross head 24 of the steering mechanism of a motor vehicle for steering the vehicle by the towing tongue structure thereby eliminating the need of an operator in the vehicle being towed.

If it is so desired in the initial building or constructing of the motor vehicles the clamps 13 and 14 may be formed upon the front axles and the tongue structure attached thereto by means of the pins 12 and arms 7 and 8.

From the foregoing description taken in connection with the accompanying drawing it will be apparent that a towing tongue for vehicles has been provided which will not only serve for towing disabled vehicles, but one which may also be utilized for towing trailers, and which will, owing to its construction, steer or guide the trailer in unison with the movement of the towing vehicle.

The towing tongue structure may be disconnected from the vehicles and the parts taken apart for storage to permit it to be conveniently carried by a motor vehicle, such as an automobile, for emergency use.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A towing tongue comprising a pair of arms, a pole pivotally connected to the arms, hook-shaped clamps pivotally connected to the arms, a clamp plate adjustably connected to said clamps, an extension on one of the arms provided with a slotted end, and a clamp device including a pin mounted in said slotted end.

2. A towing tongue comprising in combination with an automobile axle a pair of hook shaped clamps engaging around the flanges of the axle, means for drawing the clamps into tight engagement with the axle, and a pole having pivotal connection with the clamps and operative connection with the steering mechanism of the automobile.

3. An automobile towing tongue comprising a pair of hook shaped clamps for engagement around the flanges of an automobile axle, a plate adjustably connected to the clamps and abutting the axle for drawing the clamps into tight engagement with the axle, and a pole having pivotal connection with the clamps and operative connection with the steering mechanism of the automobile.

In testimony whereof I affix my signature.

WILLIAM D. HENRY.